United States Patent [19]

Van Erp et al.

[11] Patent Number: 4,613,488
[45] Date of Patent: Sep. 23, 1986

[54] PROCESS FOR THE PREPARATION OF CRYSTALLINE ALUMINUM SILICATE COMPOUNDS USING PYRIDINE AND A QUATERNARY AMMONIUM COMPOUND

[75] Inventors: Willibrord A. Van Erp; Josepha M. E. Seelen-Kruijssen; Tom Huizinga, all of Amsterdam, Netherlands

[73] Assignee: Shell Oil Company, Houston, Tex.

[21] Appl. No.: 741,789

[22] Filed: Jun. 6, 1985

[30] Foreign Application Priority Data

Sep. 18, 1984 [GB] United Kingdom ................. 8423615

[51] Int. Cl.$^4$ ............................................ C01B 33/28
[52] U.S. Cl. .................... 423/328; 423/329
[58] Field of Search ........... 423/328 T, 328 D, 329 T, 423/328, 329

[56] References Cited

U.S. PATENT DOCUMENTS

| 3,702,886 | 11/1972 | Argauer et al. | 423/328 |
|---|---|---|---|
| 4,205,053 | 5/1980 | Rollmann | 423/329 |
| 4,251,499 | 2/1981 | Nanne et al. | 423/328 T |
| 4,259,306 | 3/1981 | Pelrine | 423/328 T |
| 4,296,083 | 10/1981 | Rollmann | 423/329 T |
| 4,390,457 | 6/1983 | Klotz | 423/329 T |
| 4,404,175 | 9/1983 | Marosi et al. | 423/328 T |
| 4,495,166 | 1/1985 | Calvert et al. | 423/329 T |
| 4,524,055 | 6/1985 | Onodera et al. | 423/328 D |

FOREIGN PATENT DOCUMENTS

| 0049386 | 4/1982 | European Pat. Off. | 423/328 T |
|---|---|---|---|
| 0101183 | 2/1984 | European Pat. Off. | 423/328 T |

*Primary Examiner*—John Doll
*Assistant Examiner*—Lance Johnson
*Attorney, Agent, or Firm*—Kimbley L. Muller

[57] ABSTRACT

A process of manufacture of a crystalline aluminum silicate is disclosed wherein the aqueous forming solution has augmented thereto both a pyridine compound and a quaternary ammonium hydroxide. The process derives a novel crystalline aluminum silicate composition of matter.

14 Claims, No Drawings

PROCESS FOR THE PREPARATION OF CRYSTALLINE ALUMINUM SILICATE COMPOUNDS USING PYRIDINE AND A QUATERNARY AMMONIUM COMPOUND

BACKGROUND OF-THE-INVENTION

The invention relates to a process for the preparation of a composite crystalline aluminium silicate. More particularly it relates to a hydrothermal process for preparing same.

Crystalline aluminium silicates, which can be distinguished from one another by certain characteristic lines occurring in their X-ray powder diffraction patterns, can be prepared hydrothermally by maintaining an aqueous alkaline starting mixture comprising one or more silicon compounds, one or more aluminium compounds, one or more alkali metal compounds and one or more organic nitrogen compounds at an elevated temperature until the crystalline aluminium silicate has formed and subsequently separating the crystalline silicate from the mother liquor, usually followed by washing and drying.

The right selection of reaction components comprised in the aqueous mixture and their molar ratios is of major importance in preparing the desired crystalline aluminium silicates.

It is known that the microscopic texture (e.g. the crystal shape, size, degree of smoothness and the degree of agglomeration of the ultimate crystals) of a synthetic zeolite is influenced by the organic nitrogen compound(s) present in the starting mixture used to carry out the above-described hydrothermal process.

When producing larger amounts of composite crystalline aluminium silicate on a (semi-)commercial scale it is highly desirable that silicates of constant quality and composition are obtained. This implies that process mixtures which comprise a considerable number of compounds are preferably kept in motion continuously or intermittently (e.g. by stirring) in order to keep the composition of the mixtures reasonably constant over their whole volume.

PRIOR ART

The preparation of synthetic zeolites from aqueous inorganic compositions is well-known. Usually the $SiO_2$ to $Al_2O_3$ ratio in the synthetic zeolite does not exceed 10. Interest has recently focused on the use of various nitrogeneous bases as a key component in the basic template of the zeolite. By using same, the crystal structure of the zeolite may be similar to a zeolite formed strictly from inorganic solutions containing, for example, silicon, aluminum, alkali metals, alkaline earth metals, etc. In other cases, the organic nitrogeneous base appears to act as a template for forming a unique zeolite.

Various examples of nitrogeneous templates used previously include tetra lower alkyl ammonium hydroxides and dimethyl-1,4-diazoniacycle(2.2.2.)octane silicates. In U.S. Pat. No. 4,205,053, issued to Rollman et al in 1980, a process is disclosed for manufacturing synthetic nitrogenous zeolites which possess large, easily filtered crystals. Succinctly, the zeolites are formed via augmentation of a substantially colorless organic basic nitrogen compound without resort to variance in either the hydrothermal manufacture conditions or the relative mole ratios of the aqueous forming solution.

These substantially colorless organic basic nitrogen compounds are broadly defined to encompass a compound wherein at least one nitrogen atom is directly attached to a carbon atom and which are soluble in an aqueous solution. More specifically, these compounds are defined as quaternary ammonium compounds having not more than three methyl, three ethyl or three propyl substituents. The amine moiety can be a 1°, 2° or 3° amine including those having organyl or hydrocarbyl substituents. The amines may be polybasic, diamines or heterocyclic. The pKa (reciprocal of the equilibrium constant) of these compounds is usually between 7 to 12. This definition expressly excludes the combination of a quaternary ammonium-compound in accompaniment with a pyridine compound, i.e. pka of about 5.

BRIEF DESCRIPTION OF INVENTION

It has now been found that from an aqueous alkaline starting mixture comprising as organic nitrogen compounds, both a pyridine and an organic quaternary ammonium compound, a composite crystalline aluminium silicate of which the X-ray powder diffraction pattern includes characteristic lines of two silicates can be reproduceably prepared, provided that the various compounds are present in the starting mixture in particular molar ratios, which are critical requirements for the process according to the present invention.

DETAILED DESCRIPTION OF INVENTION

The present invention relates to a process for the preparation of a composite crystalline aluminium silicate which comprises maintaining an aqueous alkaline starting mixture comprising one or more silicon compounds, one or more aluminium compounds, one or more compounds of metals from Group 1A of the Periodic Table of the Elements (MX) and organic nitrogen compounds inclusive of both pyridine and a quaternary ammonium compound at an elevated temperature until the composite crystalline aluminium silicate has formed and subsequently separating the crystalline silicate from the mother liquor, wherein the various compounds are present in the starting mixture within the following molar ratios:

$RN:R_4NY = 6-3,000$,
$SiO_2:R_4Ny = 200-10,000$
$SiO_2:Al_2O_3 = 50-250$,
$SiO_2:Mx < 10$ and
$H_2O:SiO_2 = 5-65$, and where RN represents a pyridine compound and $R_4NY$ represents an organic quaternary ammonium compound.

The Periodic Table of the Elements referred to is stated in the "Handbook of Chemistry and Physics", 55th edition, CRC Press, Ohio, USA (1975).

The term pyridine is not meant to include quaternary ammonium compounds but is inclusive of pyridine, (the preferred pyridine), $C_1-C_4$ alkyl pyridines and substituted $C_1-C_4$ alkyl pyridines. The $R_4$ moiety in the quaternary ammonium compounds $(R_4)NY$ comprises four of the same or different alkyl-groups and/or substituted alkyl-groups. The latter is represented by unsubstituted alkyl groups or alkyl groups having a hydroxy and/or halogen (e.g. bromine) substituent or substituents. The alkyl groups have from 1 to 20 carbon atoms, with 1 to 4 being the preferred length of the carbon chain. The Y symbol of the quaternary ammonium compounds, $(R_4)NY$, represents an anion of a mineral acid or a hydroxyl ion. Preferably the quaternary ammonium compound $(R_4)NY$ is tetrapropyl ammonium hydroxide, or alternatively, tetraethyl ammonium bromide.

The above-defined pyridine compounds, RN, and quaternary ammonium compounds, $R_4NY$, are present in the starting mixture in a molar ratio of from 25–600, and preferably of from 40–450. The molar ratio in which $SiO_2$ and $R_4NY$ are present in the starting mixture is suitably of from 300–2000, and preferably of from 450–1500.

The compound, MX, in the starting mixture preferably represents at least one of $M_nZ$ and at least one of MOH in which M represents an alkali metal ion and Z represents an anion of a mineral acid (satisfying the electroneutrality of the compound $M_nZ$); most preferably, M represents a sodium ion. The compounds $SiO_2$ and MOH are suitably present in the starting mixture in a molar ratio of from 5.2–7.8, and preferably of from 5.6–7.0. In any case, the aqueous starting mixture has an alkaline character which means that the pH of the starting mixture is greater than 7.

The compounds $SiO_2$, $Al_2O_3$ and $H_2O$ are preferably present in the starting mixture in the following molar ratios: $SiO_2:Al_2O_3=65-200$, and $H_2O:SiO_2=8-50$.

The starting mixture used in the process according to the present invention includes various silicon- and aluminium compounds. Suitable silicon compounds include water glass and amorphous silica, while suitable aluminium compounds include aluminium sulphate and sodium aluminate. Suitable alkali metal salts of mineral acids include sulphates, nitrates and phosphates. It is not necessary, however, that the above-mentioned compounds are added to the aqueous starting mixture in that form. They may also be formed from other reaction components, for instance from water glass and sulphuric acid.

In a specific preferred embodiment of this invention the aqueous solution comprises (1) amorphous silica, aluminum sulfate, sodium hydroxide, sodium sulfate, pyridine, water and either tetrapropyl ammonium hydroxide or tetraethyl ammonium bromide.

The composite crystalline aluminium silicates are suitably prepared by maintaining the starting aqueous mixture, usually under autogenous pressure, at an elevated temperature, preferably of from 100°–250° C. for 24–190 hours under stirred conditions, until composite crystalline aluminium silicate has formed, subsequently separating the crystalline silicate from the mother liquor (e.g. by means of filtration or centrifugation), washing the crystalline silicate thus obtained, drying (suitably at a temperature of from 100°–200° C.) the washed crystalline silicate, and optionally, calcining the dried crystalline silicate at a temperature of from 200°–600° C.

The present invention also relates to a novel composite crystalline aluminium silicate which has been prepared according to a hereinafter claimed process.

The crystalline silicates prepared according to the present process contain alkali metal. An alkali metal content of more than 0.1% by weight is undesirable when the composite crystalline aluminium silicates are to be used as a catalyst or a catalyst carrier in the catalytic dewaxing of hydrocarbon oils. In order to reduce the alkali metal content of the composite silicates to less than 0.1% by weight, when such is desired, and in particular to less than 0.01% by weight, the silicates are suitably contacted once or repeatedly with an aqueous solution which comprises ammonium ions. From the $NH_4$ silicates obtained in this manner, the $H^+$ silicates can be prepared by calcination.

If desired, the preformance in a catalytic dewaxing process of the composite silicates, which have been prepared by this method of manufacture, can be further improved by using them simultaneously as carrier for one or more catalytically active metals from Groups VIB, VIIB and VIII of the Periodic Table of the Elements or compounds thereof. Of particular interest are the metals molybdenum, tungsten, chromium, iron, nickel, cobalt, platinum, palladium, ruthenium, rhodium, osmium and irridium or compounds containing same; the metals or their compounds may be deposited on the composite silicates by means of any process for the preparation of catalysts known in the art, such as impregnation, ion-exchange or precipitation.

When the composite silicates are used as catalysts or catalyst carriers they should generally be available in the form of particles with a diameter of 0.5–5 mm. In the process according to the present invention, the composite silicates are normally obtained in the form of a fine powder. The composite silicates may be shaped to form particles of a larger size, for instance by pressing. During shaping, the silicates may be combined with a binder material; preferably a binder material is used which contains no or only very little alkali metal such as alumina.

The hydrocarbon oils which are to be dewaxed with the composite silicate catalyst (carrier) are preferably selected from the group consisting of lubricating oils and transformer oils (in order to reduce their pour point), and kerosenes and gas oils (in order to reduce their freezing point).

The catalytic dewaxing process according to the present invention may suitably be carried out at a temperature of from 200°–500° C., a hydrogen pressure of from 5–100 bar, a space velocity of from 0.1–5 $kg.l^{-1.h-l}$ and a hydrogen/oil ratio of from 100–2500 $nl.kg^{-1}$. The process is preferably carried out at a temperature of from 250°–450° C., a hydrogen pressure of from 10–75 bar, a space velocity of from 0.3–3 $kg.l^{-1.h-l}$ and a hydrogen/oil ratio of from 200–2000 $Nl.kg^{-1}$.

Furthermore, the present invention relates to molecular sieves which comprise a composite crystalline aluminium silicate prepared as hereinbefore described, and to the application of such molecular sieves in a process for separating compounds with a substantially unbranched structure from mixtures of these compounds with compounds having a branched and/or cyclic structure. For this application the composite silicate should be at least partly dehydrated.

EXAMPLES

The following examples are provided to exemplify the crystalline aluminium silicate of this invention, how such is manufactured and how the same differs from other silicates derived by other (non-combinative pyridine and quaternary ammonium compound) methods of manufacture. The developed physical parameters are given only for purposes of example and not as an undue or restricting limitation thereon.

EXAMPLE 1

In this Example a crystalline aluminum silicate was prepared using the aqueous admixture of components of this invention. This silicate will hereinafter be referred to as Silicate A.

An aqueous alkaline starting solution was prepared by adding water to the following: amorphous silica, aluminium silicate, sodium, sulfate, sodium hydroxide, pyridine and tetrapropyl ammonium hydroxide. The relative amounts of components were as follows:

93.5[SiO$_2$]—1[Al$_2$O$_3$]—30[C$_5$H$_5$N]—0.1[(C$_3$H$_7$)$_4$NOH]—7.4[Na$_2$O]—19.6[Na$_2$SO$_4$]—1938[H$_2$O].

The aqueous admixture was maintained at 150° C. for 75 hours with stirring in an autoclave under autogenous pressure. After cooling the aqueous admixture, the resultant crystalline aluminum silicate was filtered off, washed with water until the pH of the washwater was about 8 and dried at 120° C. for 16 hours. This was denoted as Silicate A and was subjected to tests to determine the following characteristic X-ray diffraction pattern of Table I in which "D-space" represents the interplanar spacing (in Å) calculated from the measured theta (Bragg angle) by using the Bragg equation and "I/I$_{max'}$%" represents the intensity of a peak, expressed as a percentage of the intensity of the main peak.

TABLE I

| D-space | I/I$_{max'}$ % |
| --- | --- |
| 9.39 | 52 |
| 3.97 | 76 |
| 3.92 | 49 |
| 3.85 | 100 |
| 3.81 | 76 |
| 3.76 | 69 |
| 3.71 | 49 |
| 3.64 | 56 |
| 3.53 | 89 |
| 3.46 | 74 |

By further analytical chemical analysis of Silicate A its aluminum content was found to be 1.14% by weight. Instant Silicate A was determined to be a crystalline intergrowth comprising substantially equal amounts of two different crystalline aluminium silicates, which are denoted as "Silicate 1 and Silicate 2".

EXAMPLE 2

Another silicate in accordance with this invention was prepared similar in nature to Example 1 with variance of the molar amount of (C$_3$H$_7$)$_4$NOH. The same increased from 0.10 to 0.32. The starting aqueous mixture was maintained at 150° C., this time for 93 hours, with stirring in an autoclave under autogenous pressure and treated further as described in the preparation of Silicate A above, i.e. filtered, washed, dried, etc.

This silicate was denoted Silicate B and subjected to X-ray diffraction analysis having the same constants and definitions in re the analysis of Silicate A. The following pattern of Table II represents that analysis.

TABLE II

| D-space | I/I$_{max'}$ % |
| --- | --- |
| 11.10 | 50 |
| 9.97 | 25 |
| 3.85 | 100 |
| 3.81 | 69 |
| 3.74 | 41 |
| 3.71 | 59 |
| 3.64 | 37 |
| 3.52 | 16 |
| 3.44 | 22 |

The aluminum content of Silicate B was 1.06% by weight and was composed of a crystalline intergrowth and comprised five times the amount of one silicate (Silicate 1) then another type of silicate (Silicate 2).

EXAMPLE 3

This Example was performed to prepare a comparative silicate without the existence of the quaternary ammonium compound in conjunct association with pyridine in the beginning aqueous solution. A similar aqueous solution was established as in Example 1 with the exception of the omission of the tetrapropyl ammonium hydroxide. The mixture was maintained at 150° C. for 113 hours with stirring in an autoclave under autogenous pressure. Thereafter, the silicate was treated in the same manner as Example 1 and denoted Silicate C. Table III shows the X-ray diffraction pattern of Silicate C after analysis similar to that undertaken with Silicates A and B.

TABLE III

| D-space | I/I$_{max'}$ % |
| --- | --- |
| 9.43 | 91 |
| 3.97 | 78 |
| 3.92 | 41 |
| 3.76 | 43 |
| 3.53 | 100 |
| 3.46 | 74 |

The silicate not prepared by the method of manufacture of this invention was found to comprise a single type of silicate, i.e. Silicate 2 with the salient exclusion of another type of silicate, e.g. Silicate 1. Silicates A and B (this invention) were found to be very different from a conventional silicate, i.e., Silicate C, the latter lacking the conjunct interaction of the quaternary ammonium compound and the pyridine compound in the beginning aqueous mixture.

EXAMPLE 4

This Example demonstrates the adsorption utility of this invention. Both Silicates A and B were calcined into the hydrogen form by contact with air at 500° C. for two hours followed by treating the silicates twice with an aqueous solution of 1.0N ammonium nitrate. From the NH$_4^+$ silicates derived therefrom the H$^+$ silicates were prepared by calcining in air at 500° C. for one hour.

Contact of the acquired calcined silicate was made with a solution of unbranched n-hexane and branched 2,2-dimethyl butane. The relative adsorption capacities were measured at 100° C. and found to be equal to those represented in Table IV.

TABLE IV

| Experiment | Silicate | N—hexane, mmol/g | 2,2 dimethyl butane, mmol/g |
| --- | --- | --- | --- |
| 1 | A | 0.84 | 0.27 |
| 2 | B | 0.99 | 0.68 |

Thus, Silicate A is more selective vis-a-vis Silicate B when applied to such a separation process.

EXAMPLE V

This Example was performed to demonstrate the dewaxing capabilities of the instant Silicate A. The dewaxing was performed on a waxy raffinate of North Sea origin comprising 21% by weight wax, 2.8 ppmw of sulphur, less than 1 ppmw of nitrogen and having a pour point of 36° C. according to ASTM D97. The dewaxing step was twice performed in a once through method of operation in a reactor containing a fixed level of hydrogen-form of Silicate A diluted with silicon carbide particles. The dewaxing procedures were performed under standard dewaxing conditions as set forth in Table V, and in the presence of hydrogen.

TABLE V

| partial hydrogen pressure bar | 40 | 40 |
|---|---|---|
| space velocity, kg feed/l. catalyst/hour | 1.5 | 0.75 |
| average reactor temperature, °C. | 345 | 330 |
| hydrogen feed rate, Nl/kg feed | 700 | 700 |

The liquid raffinates acquired in these two dewaxing experiments were distilled in a vigreux column with the resulting fractions boiling above 300° C. and pour points of −18° C. measured via ASTM D97. The yield of liquid dewaxed raffinate, calculated as a weight percentage on the basis of hydrocarbon feed, was 73 in both procedures. The stability of the Silicate A was evaluated by continuing the first procedure for 540 hours during which period virtually no change in raffinate yield or in pour point of the dewaxed raffinate was observed. From these results it is apparent that Silicate A is an excellent stable dewaxing catalyst.

What we claim as our invention is:

1. A process for the preparation of a mixture of two crystalline aluminum silicates which comprises crystallizing an aqueous forming solution comprising one or more silicon compounds, one or more aluminum compounds, one or more compounds of metals of Group 1A of the Periodic Table (MX) a quaternary ammonium compound and a nitrogen compound from the group consisting of pyridine, a $C_1-C_4$ alkyl pyridine or a substituted $C_1-C_4$ alkyl pyridine compound and at elevated temperatures, subsequently separating said crystallized silicate from said aqueous solution and drying said removed mixture of two crystalline aluminum silicates as represented by the X-ray diffraction patterns of Tables I or II.

2. The process of claim 1 wherein said silicon compound is $SiO_2$, said aluminum compound is $Al_2O_3$, said pyridine is represented by (RN) and said quaternary ammonium compound is represented by $R_4NY$ wherein R is the same or different $C_1$ to $C_{20}$ alkyl groups or $C_1$ to $C_{20}$ substituted alkyl groups and wherein y is equal to an anion of a mineral acid or a hydroxyl ion and where said compounds are present in the following molar relationships $RN:R_4NY = 6-3,000$
$SiO_2:R_4NY = 200-10,000$
$SiO_2:Al_2O_3 = 60-250$
$SiO_2:Mx < 10$, and
$H_2O:SiO_2 = 5-65$.

3. The process of claim 2 wherein the resultant mixture of two crystalline aluminum silicates possesses an X-ray diffraction pattern as follows:

| D-space | $I/I_{max'}$ % |
|---|---|
| 9.39 | 52 |
| 3.97 | 76 |
| 3.92 | 49 |
| 3.85 | 100 |
| 3.81 | 76 |
| 3.76 | 69 |
| 3.71 | 49 |
| 3.64 | 56 |
| 3.53 | 89 |
| 3.46 | 74 |

4. The process of claim 2 wherein the resultant mixture of two crystalline aluminum silicates possesses an X-ray diffraction pattern as follows:

| D-space | $I/I_{max'}$ % |
|---|---|
| 11.10 | 50 |
| 9.97 | 25 |
| 3.85 | 100 |
| 3.81 | 69 |
| 3.74 | 41 |
| 3.71 | 59 |
| 3.64 | 37 |
| 3.52 | 16 |
| 3.44 | 22 |

5. The process of claim 1 wherein said pyridine and said quaternary ammonium compound are present in the starting aqueous forming solution in a molar ratio of from 25-600.

6. The process of claim 1 wherein said MX compound represents at least one $M_nZ$ and at least one MOH in which M is equal to an alkali metal ion, Z is equal to an anion of a mineral acid and n is controlled by the valance of said M and Z.

7. The process of claim 1 wherein said forming solution comprises amorphous silica, aluminum sulfate, sodium sulfate, pyridine, water and tetrapropyl ammonium hydroxide.

8. The process of claim 1 wherein said forming solution comprises amorphous silica, aluminum sulfate, sodium sulfate, pyridine, water and tetraethyl ammonium bromide.

9. In a process for the preparation of a mixture of two crystalline aluminum silicates comprising crystallizing an aqueous forming solution of one or more silicon compounds, one or more aluminum compounds and one or more compounds of metals of Group 1A of the Periodic Table, the improvement which comprises the conjunct presence of pyridine and a quaternary ammonium compound in said forming solution.

10. The process of claim 9 wherein said silicon compound is $SiO_2$, said aluminum compound is $Al_2O_3$, said compound of metal of Group 1A is sodium hydroxide, and said quaternary ammonium compound is tetrapropyl ammonium hydroxide in the aqueous solution in the following molar quantities Pyridine:tetrapropyl ammonium hydroxide = 6–3,000
$SiO_2$:tetrapropyl ammonium hydroxide = 200–10,000
$SiO_2:Al_2O_3 = 60-250$
$SiO_2$:sodium hydroxide = <10; and
$H_2O:SiO_2 = 5-65$.

11. The process of claim 9 wherein the pka of the conjunct association of said pyridine and said quaternary ammonium compound is less than 5.

12. The process of claim 9 wherein said quaternary ammonium hydroxide compound is represented by $(R_4)NY$, wherein said Y is equal to an anion of a mineral acid or a hydroxyl ion and wherein said R is equal to the same or different alkyl or substituted alkyl moieties having from one to twenty carbon atoms.

13. The process of claim 12 wherein said quaternary ammonium compound is tetrapropyl ammonium hydroxide.

14. The process of claim 12 wherein said quaternary ammonium compound is tetraethyl ammonium hydroxide.

* * * * *